UNITED STATES PATENT OFFICE.

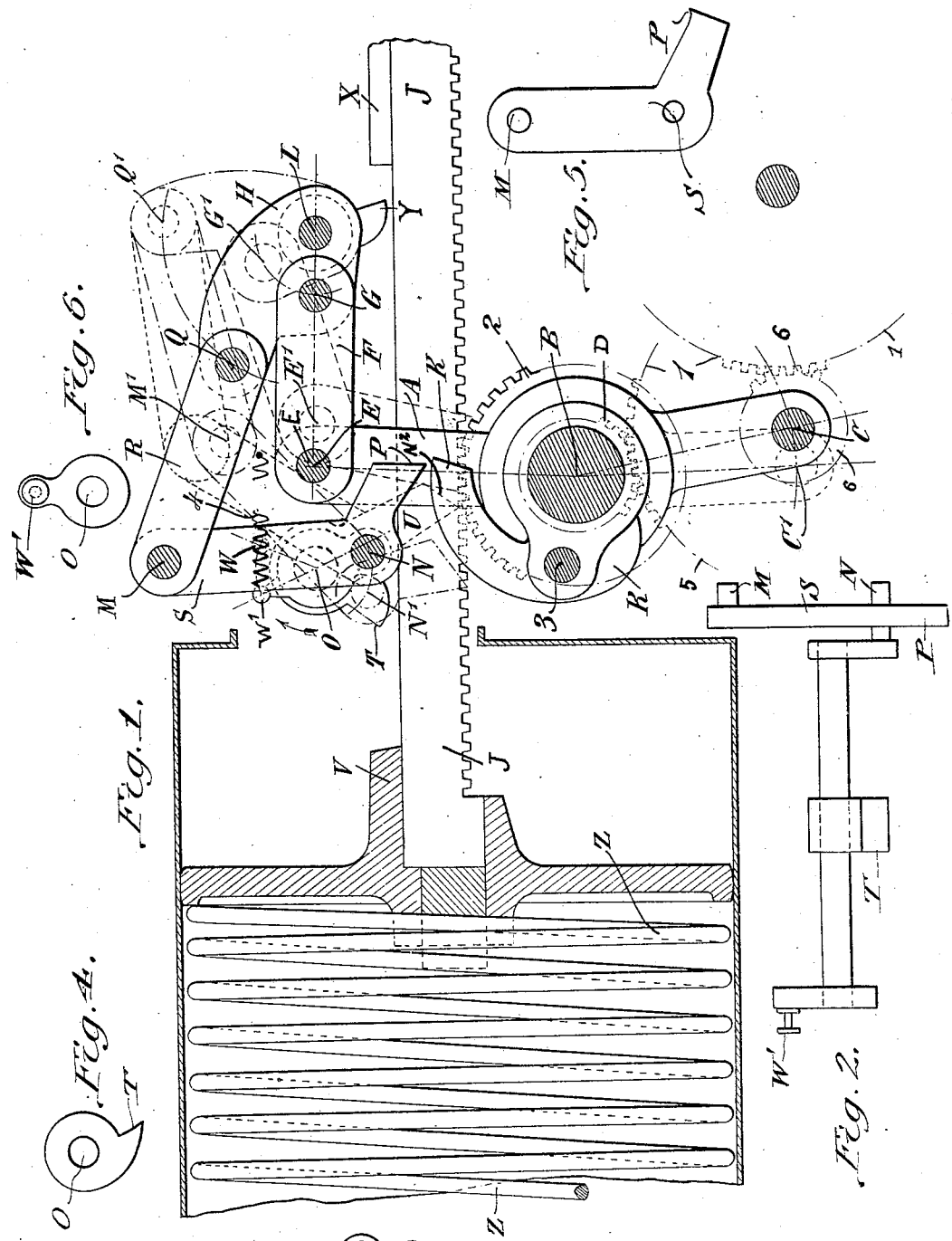

EUGENIO CANTONO, OF ROME, ITALY.

AUTOMATIC STARTING DEVICE.

1,049,206. Specification of Letters Patent. Patented Dec. 31, 1912.

Application filed November 27, 1909. Serial No. 530,099.

*To all whom it may concern:*

Be it known that I, EUGENIO CANTONO, a subject of the King of Italy, residing at Villa Serverina, Viale Parioli, Rome, Italy, retired captain of the engineers in the Royal Italian Army, have invented a certain new and useful Automatic Starting Device, of which the following is a specification.

In the device covered by my U. S. patent filed on 22 June 1907, Ser. No. 380208, when the operator is to recharge the spring, counterweight or similar device, by acting directly or by means of a suitable mechanical transmission he effects the alinement of the pivoting arms which carry the gearing designed to transmit the movement of the motor to the spring compressing rack.

My present invention has for its object to provide a device for effecting the said alinement automatically after each distention of the spring.

Figure 1 shows a side elevation of the device with the spring casing in section; Fig. 2 shows the secondary shaft carrying one of the operating levers; Fig. 3 shows one of the detents separately; Fig. 4 shows the notched arm on the shaft; Fig. 5 shows the bent lever; and, Fig. 6 shows the arm for the spring on the secondary shaft.

In the drawing, on the shaft B of the motor a lever A swings freely and carries at its lower end a pivot C on which rotates a gear 5 meshing with a gear D fast on the motor shaft B. Gear 5 is fast to a gear 6 that meshes with a gear 1 in the position of the lever A shown in full lines, but when the lever is shifted to the broken line position 6 and 1 are out of mesh. The gear 2 is loosely carried by the shaft B and meshes with the rack J secured to the spring Z by which the spring is compressed upon rotation of said gears in one direction. Lever A has a pivot E carrying link F connecting by pin G with an arm H swinging on a stationary pivot L. Arm H also carries lug Y engaged by block X on rack J when the spring has been compressed to swing arm H.

On stationary axis O is mounted a crank lever S—P carrying a pivot N on which is pivoted the lever S. A pin M connects the lever S with link R, the latter by pin Q being pivoted to arm H. Shaft O has keyed thereto a lug T capable of engaging lug V rigidly fixed to the rack. Lever S—P is capable of passing with its pivot from position $N^1$ to position $N^2$.

On the motor shaft is a pivot 3 on which swings a pawl K that is thrown out by centrifugal force and engages the arm P in its lower or depressed position.

In the operation of the device, when the lever A has swung to bring gears 6 and 1 to mesh through gears 1 and 2, gear 2 will advance the rack J to compress the spring Z. At the limit of this movement block X strikes lug Y and shifts the combination of links and lever from the full position in which it shows, to the broken line position. The rotation of the shaft will throw out a pawl K that will strike the lug P in the broken line position and again shift the levers, causing the gears 5 and 1 to be separated. When the spring Z is opening from its closed position, lug V will strike the arm T and rotate shaft O against the tension of spring W connected to pivot $W^1$. This will swing the arm P away from the left hand position into position to be struck by the pawl K, and the latter will engage causing the lever A to be shifted to bring the gears 5 and 1 into mesh, causing the spring to be again put under tension.

Having now fully described my invention and the manner in which the same is to be performed, I declare that what I claim is:

1. In a starting device, the combination of a casing, a spring in the casing, a rack on the spring, a lug on each end of the rack, a motor shaft, an arm loose on the motor shaft, a gear pivoted on said arm, a second shaft carrying a gear arranged to mesh with said gear on the arm in one position of the arm, a gear fast to the said gear on the arm, a gear fast on the shaft in mesh with the latter gear, another gear on the motor shaft meshing with said rack, a pawl on the motor shaft arranged to swing out by centrifugal force, an arm swinging on a stationary pivot, a link connecting said arm with said lever, a second arm swinging on a stationary pivot, a link pivoted to the latter arm, a link pivoted between the latter link and said first arm, a lug on the second link arranged to be engaged by said pawl in one position, a lug connected with the second arm to be engaged by one lug on the rack, and a lug on the first arm arranged to be engaged by the other lug on the rack.

2. In a starting device, the combination of a casing, a spring in the casing, a rack on the spring, a lug on each end of the rack, a motor shaft, an arm loose on the motor shaft, a gear pivoted on said arm, a second shaft carrying a gear arranged to mesh with said gear on the arm in one position of the arm, a gear fast to the said gear on the arm, a gear fast on the shaft in mesh with the latter gear, another gear on the motor shaft meshing with said rack, a pawl on the motor shaft arranged to swing out by centrifugal force, an arm swinging on a stationary pivot, a link connecting said arm with said lever, a second arm swinging on a stationary pivot, a link pivoted to the latter arm, a link pivoted between the latter link and said first arm, a lug on the second link arranged to be engaged by said pawl in one position, a lug connected with the second arm to be engaged by one lug on the rack, and a lug on the first arm arranged to be engaged by the other lug on the rack; and a spring connected with the second arm normally retaining it in position to be engaged by its said lug.

In testimony whereof I have affixed my signature in presence of two witnesses.

EUGENIO CANTONO.

Witnesses:
G. B. ZANARDO,
G. BISSARRI.

Copies of this patent may be obtained for five cents each, by addressing the "Commissioner of Patents, Washington, D. C."